(12) United States Patent
Kim

(10) Patent No.: US 11,893,255 B2
(45) Date of Patent: Feb. 6, 2024

(54) MEMORY SYSTEM FOR MANAGING DATA CORRESPONDING TO A PLURALITY OF ZONES AND OPERATING METHOD THEREOF

(71) Applicant: SK hynix Inc., Gyeonggi-do (KR)

(72) Inventor: Bo Kyeong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 112 days.

(21) Appl. No.: 17/726,771

(22) Filed: Apr. 22, 2022

(65) Prior Publication Data

US 2023/0195342 A1 Jun. 22, 2023

(30) Foreign Application Priority Data

Dec. 21, 2021 (KR) .................. 10-2021-0183868

(51) Int. Cl.
*G06F 3/06* (2006.01)

(52) U.S. Cl.
CPC ............ *G06F 3/064* (2013.01); *G06F 3/0602* (2013.01); *G06F 3/0655* (2013.01)

(58) Field of Classification Search
CPC ........ G06F 3/0602; G06F 3/061; G06F 3/064; G06F 3/0655; G06F 3/0679
USPC ........................................................ 711/154
See application file for complete search history.

(56) References Cited

U.S. PATENT DOCUMENTS

| 8,694,859 | B2 | 4/2014 | Shalvi et al. | |
| 8,788,786 | B2 | 7/2014 | Yamamoto | |
| 2009/0310412 | A1* | 12/2009 | Jang ................... | G06F 12/0246 365/185.11 |
| 2014/0250264 | A1* | 9/2014 | Yano ................... | G06F 12/0246 711/103 |
| 2021/0034297 | A1* | 2/2021 | Park .................... | G06F 12/0246 |

FOREIGN PATENT DOCUMENTS

KR 10-2021-0108107 A 9/2021

\* cited by examiner

*Primary Examiner* — Hashem Farrokh
(74) *Attorney, Agent, or Firm* — IP & T GROUP LLP

(57) ABSTRACT

The embodiments of the present disclosure relate to a memory system for managing data corresponding to a plurality of zones and operating method thereof. According to embodiments of the present disclosure, the memory system may include i) a memory device including a plurality of memory blocks each including a plurality of pages, and ii) a memory controller configured to write data corresponding to a plurality of zones to a first area including two or more of the plurality of memory blocks, flush the data corresponding to a first zone among the plurality of zones to a second area including two or more of the plurality of memory blocks on determination that a flush condition set for the first zone is satisfied.

20 Claims, 17 Drawing Sheets

(size of AREA_1) >= (size of Active Zone) + (size of Zone that can be flushed to AREA_2 simultaneously)

MEMORY SYSTEM FOR MANAGING DATA CORRESPONDING TO A PLURALITY OF ZONES AND OPERATING METHOD THEREOF

CROSS-REFERENCES TO RELATED APPLICATION

The present application claims priority under 35 U.S.C. 119(a) to Korean patent application number 10-2021-0183868 filed on Dec. 21, 2021, which is incorporated herein by reference in its entirety.

TECHNICAL FIELD

The embodiments of the present disclosure relate to a memory system for managing data corresponding to a plurality of zones and operating method thereof.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling a memory device. The memory controller may receive a command from the host and, on the basis of the received command, may execute the command or control read/write/erase operations on the memory devices in the memory system. The memory controller may be used to execute firmware operations for performing a logical operation for controlling such operations.

Furthermore, with the development of NAND stacking technology, the storage capacity of a memory block included in the memory device is increasing.

SUMMARY

Embodiments of the present disclosure may provide a memory system and operating method thereof, capable of efficiently managing a zone with a size smaller than the storage capacity of the memory block.

Also, embodiments of the present disclosure may provide a memory system and operating method thereof, capable of improving the performance of a read or write operation for data stored in a zone by writing data stored in the zone to a plurality of memory blocks in parallel.

In one aspect, an embodiment of the present disclosure may provide a memory system including i) a memory device including a plurality of memory blocks each including a plurality of pages, and ii) a memory controller configured to write data corresponding to a plurality of zones to a first area including two or more of the plurality of memory blocks, flush the data corresponding to a first zone among the plurality of zones to a second area including two or more of the plurality of memory blocks on determination that a flush condition set for the first zone is satisfied. A size of each of the plurality of zones may be less than or equal to a storage capacity of each of the plurality of memory blocks.

In another aspect, an embodiment of the present disclosure may provide a memory controller including i) a memory interface for communicating with an external device including a plurality of memory blocks each including a plurality of pages and ii) a control circuit configured to write data corresponding to a plurality of zones to a first area including two or more of the plurality of memory blocks and flush the data corresponding to a first zone among the plurality of zones to a second area including two or more of the plurality of memory blocks on determination that a flush condition set for the first zone is satisfied. A size of each of the plurality of zones may be less than or equal to a storage capacity of each of the plurality of memory blocks.

In another aspect, an embodiment of the present disclosure may provide an operating method of memory system, the operating method may include writing data corresponding to a plurality of zones to a first area including two or more of a plurality of memory blocks each including a plurality of pages, determining whether a flush condition set for the first zone among the plurality of zones is satisfied and flushing, on determination that the flush condition set for the first zone is satisfied, the data corresponding to the first zone to a second area including two or more of the plurality of memory blocks. A size of each of the plurality of zones may be less than or equal to a storage capacity of each of the plurality of memory blocks.

According to embodiments of the present disclosure, it is possible to efficiently manage a zone with a size smaller than the storage capacity of the memory block and improve the performance of a read or write operation for data corresponding to the zone by writing data corresponding to the zone to a plurality of memory blocks in parallel.

DETAIL DESCRIPTION OF THE EXEMPLARY EMBODIMENTS

Figure 1:
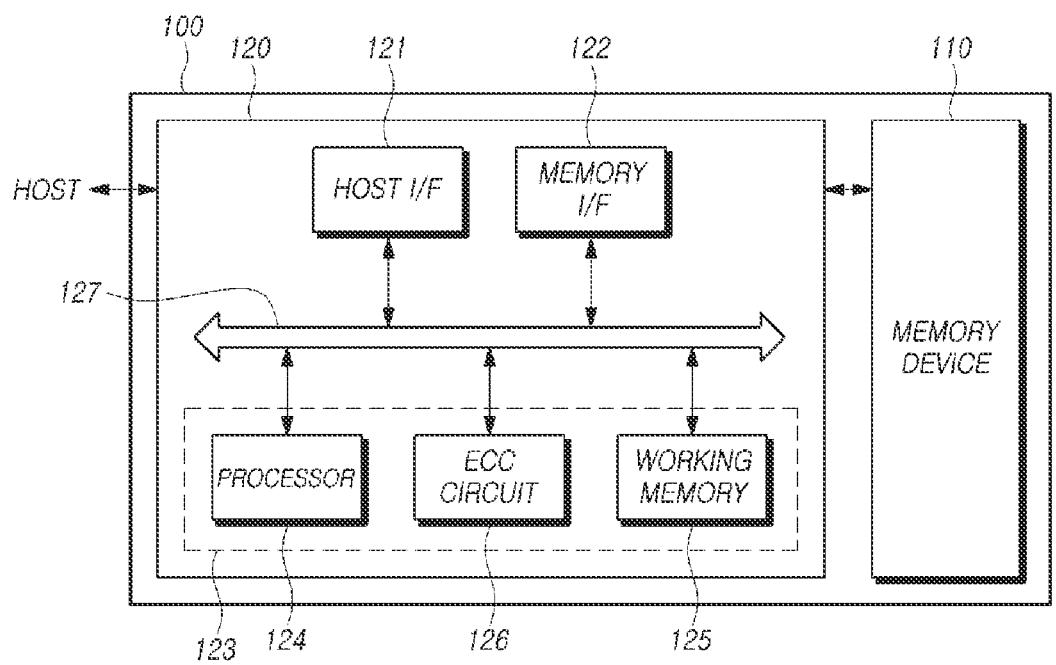
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erase operation, and the like. During the program operation, the memory device 110 may write data in the area selected by the address. During the read operation, the memory device 110 may read data from a memory area selected by the address. During the erase operation, the memory device 110 may erase data stored in a memory area selected by the address.

The memory controller 120 may control write (program), read, erase, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. The processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all read data in this manner, the error detection/correction circuit 126 may acquire information as to which sector is deemed uncorrectable in the read data. The error detection/correction circuit 126 may provide such information e.g., address of uncorrectable bits, to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
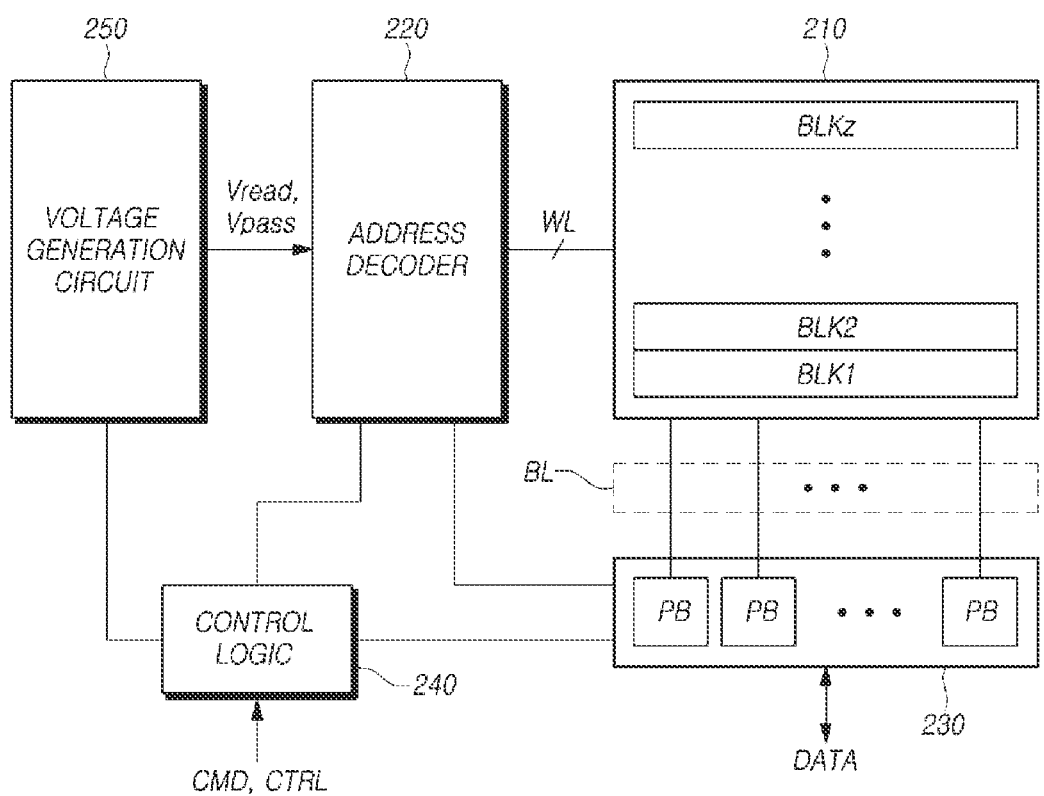
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line which may be the ground, directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line, also referred to as a source selection line or a drain selection line, may be additionally arranged outside the first outermost word line, which is closer to the read/write circuit 230 among two outermost word lines, and a second selection line, also referred to as a drain selection line or a source selection line, may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erase operation may be performed memory block by memory block.

Figure 3:
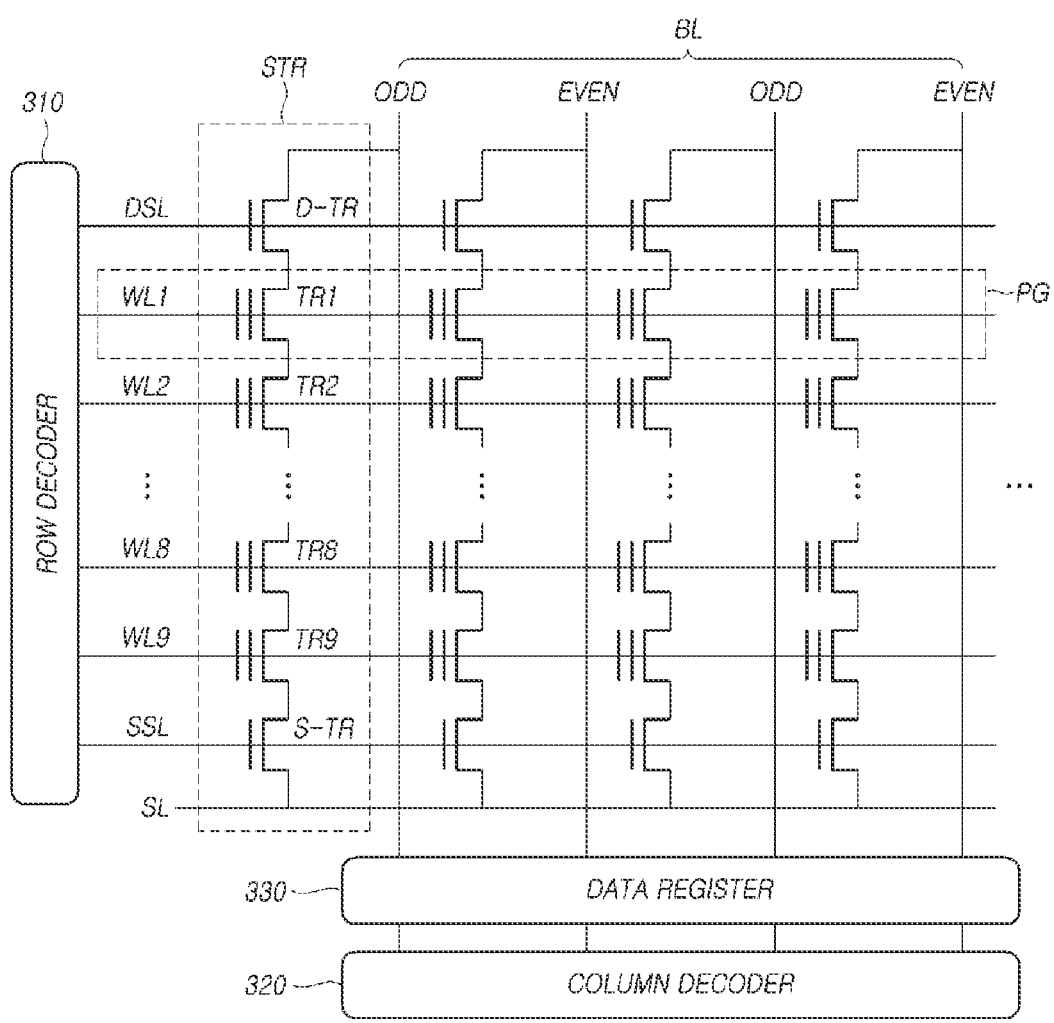
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area, which is the remaining area other than the core area, and includes circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch circuit that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erase operation. The memory system 100 applies a certain voltage to allow both the first selection transistor D-TR and the second selection transistor S-TR to float during an erase operation. As a result, the applied erase voltage can remove electrical charges from the floating gates FG of the selected memory cells.

Figure 4:
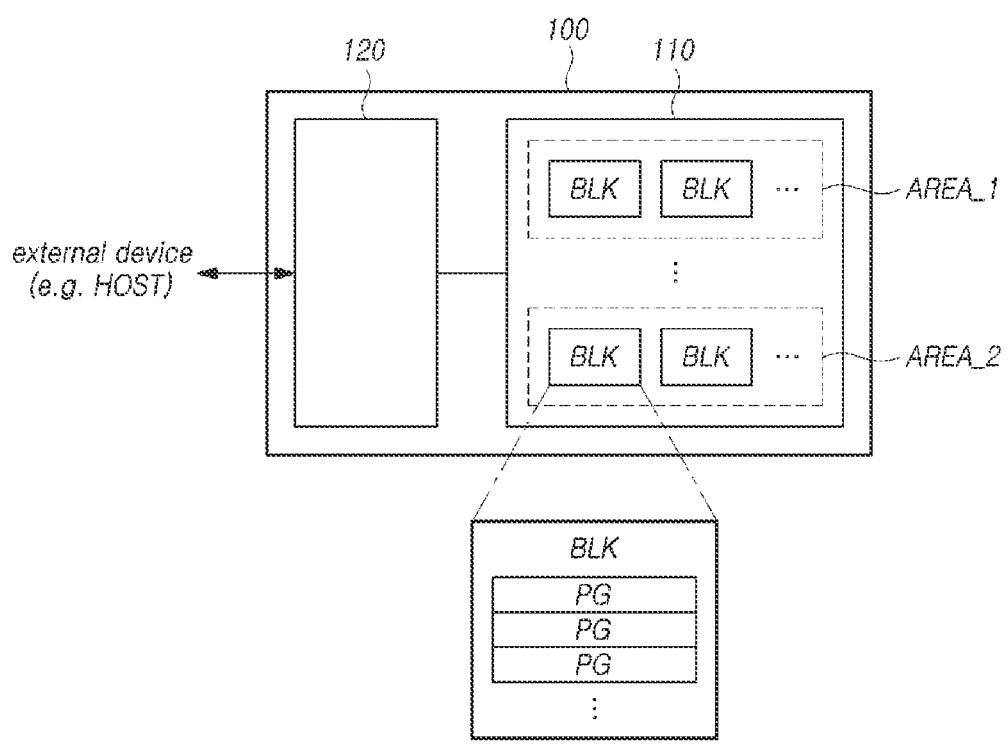
FIG. 4 illustrates a schematic structure of the memory system according to embodiments of the present disclosure.

FIG. 4 illustrates a schematic structure of the memory system 100 according to embodiments of the present disclosure.

Referring to FIG. 4, the memory system 100 may include a memory device 110 and a memory controller 120.

The memory device 100 may include a plurality of memory blocks BLK. Each of the plurality of memory blocks BLK may include a plurality of pages PG.

In the embodiments of the present disclosure, a first area AREA_1 and a second area AREA_2 may be included in the memory device 110.

The first area AREA_1 may include two or more of the plurality of memory blocks BLK. The second area AREA_2 may also include two or more of the plurality of memory blocks BLK. In this case, the memory blocks included in the first area AREA_1 and the memory blocks included in the second area AREA_2 are different from each other.

The memory controller 120 may communicate with the memory device 110. Also, the memory controller 120 may read data from the memory device 110 or may write data to the memory device 110.

For example, the memory controller 120 may communicate with an external device (e.g., host HOST) located outside the memory system 100 to read or write data.

For example, the memory controller 120 may receive a command from the external device, process the received command, and then transmit the processing result to the external device.

Hereinafter, the structures of the first area AREA_1 and the second area AREA_2 will be described.

Figure 5:
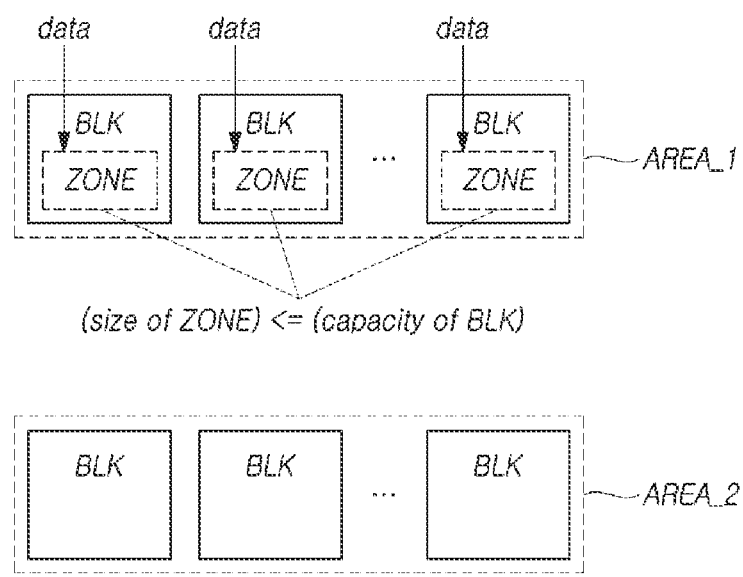
FIG. 5 illustrates a first area and a second area according to embodiments of the present disclosure.

FIG. 5 illustrates a first area AREA_1 and a second area AREA_2 according to embodiments of the present disclosure.

Referring to FIG. 5, the memory controller 120 may write data corresponding to a plurality of zones ZONE to the first area AREA_1.

A sub-area corresponding to each of the plurality of zones ZONE may exist in the first area AREA_1. That is, each of the plurality of zones ZONE may be mapped to a specific sub-area included in the first area AREA_1.

For example, the sub-area may be a part of memory block or pages included in the first area AREA_1. In FIG. 5, only a case in which each of the plurality of zones ZONE is mapped to the inside of one of the plurality of memory blocks BLK is illustrated, but it is also possible that one of the plurality of zones ZONE is distributed and mapped to the plurality of memory blocks BLK.

In this case, data to be stored in each of the plurality of zones ZONE may be sequentially stored according to the order of logical addresses corresponding to the corresponding zone. Logical addresses included in the corresponding zone may be contiguous.

When data is written to the corresponding zone, the data may be sequentially written according to the order of logical addresses corresponding to the corresponding zone. In order to sequentially write data to the corresponding zone, the memory controller 120 may set a write pointer indicating a location where data is written in the corresponding zone.

In the embodiments of the present disclosure, the size of each of the plurality of zones ZONE may be less than or equal to a storage capacity of each of the plurality of memory blocks BLK included in the memory device 100. For example, when the storage capacity of each of the plurality of memory blocks BLK is 256 MB, the size of each of the plurality of zones ZONE may be 128 MB.

As such, when the size of each of the plurality of zones ZONE is less than or equal to the storage capacity of each of the plurality of memory blocks BLK, two or more zones may be mapped to one of the plurality of memory blocks BLK. This will be described in more detail with reference to FIG. 10.

However, when two or more zones are mapped to a selected one of the plurality of memory blocks BLK, additional mapping information is required indicating the respective zones mapped to the selected memory block and data corresponding to the respective zones among data stored in the selected memory block. In addition, it is impossible to parallel access the data corresponding to the plural zones mapped to the selected memory block (e.g., it is impossible to perform a read/write operation simultaneously on the plural zones), so a quality of service (QoS) problem may occur.

Accordingly, in the embodiments of the present disclosure, the memory system 100 capable of efficiently managing the plurality of zones ZONE and improving the performance of a read or write operation for data corresponding to the plurality of zones ZONE, when the size of each of the plurality of zones ZONE is less than or equal to the storage capacity of each of the plurality of memory blocks BLK included in the memory device 110, will be described.

In the embodiments of the present disclosure, data to be stored in the plurality of zones ZONE may be first written to the first area AREA_1 and then flushed to the second area AREA_2. Hereinafter, this will be described in detail with reference to FIG. 6.

Figure 6:
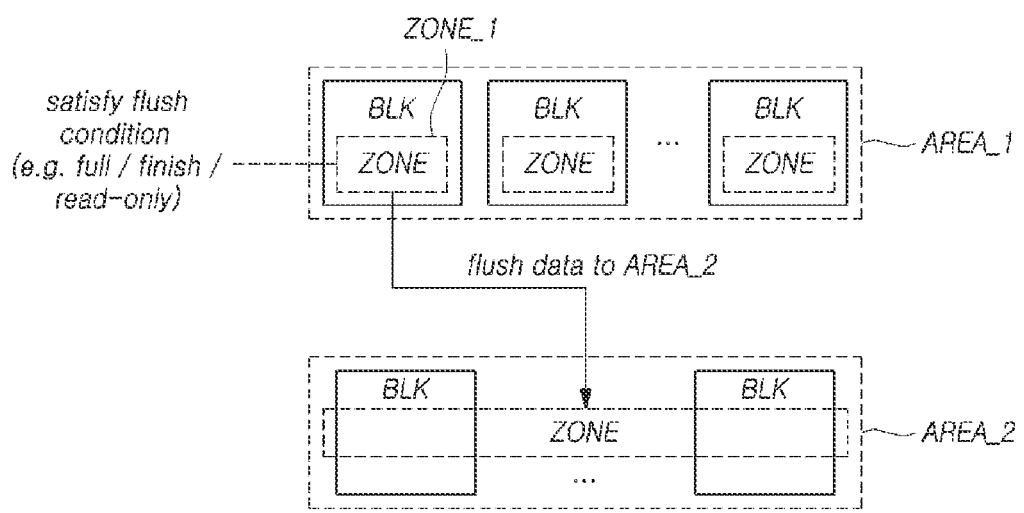
FIG. 6 illustrates an example of an operation in which the memory system flushes data corresponding to the first zone to the second area according to embodiments of the present disclosure.

FIG. 6 illustrates an example of an operation in which the memory system 100 flushes data corresponding to the first zone ZONE_1 to the second area AREA_2 according to embodiments of the present disclosure.

Referring to FIG. 6, the memory controller 120 of the memory system 100 determines whether a flush condition set for the first zone ZONE_1 among the plurality of zones ZONE is satisfied.

For example, the memory controller 120 may determine that the flush condition set for the first zone ZONE_1 is satisfied when i) the first zone ZONE_1 is full of data, ii) a finish command for the first zone ZONE_1 is received from outside the memory system 100, or iii) the state of the first zone ZONE_1 is changed to read-only state.

When the first zone ZONE_1 is full of data, it means that data is written in the entire first zone ZONE_1, so that additional data cannot be written to the first zone ZONE_1 anymore.

Receiving the finish command for the first zone ZONE_1 from outside of the memory system 100 means that indication that additional data is no longer written for the first zone ZONE_1 is received from the outside of the memory system 100.

When the state of the first zone ZONE_1 is changed to read-only state, it means that it is only possible to read data corresponding to the first zone ZONE_1, and it is impossible to write data in the first zone ZONE_1.

As described above, when the flush condition set for the first zone ZONE_1 is satisfied, it is impossible to write additional data into the first zone ZONE_1. In this case, the memory controller 120 may write data back to the first zone ZONE_1 after the first zone ZONE_1 is reset and converted to an empty state.

When it is determined that flush condition set for the first zone ZONE_1 is satisfied, the memory controller 120 may flush the data corresponding to the first zone ZONE_1 to the second area AREA_2.

In this case, the memory controller 120 may flush the data corresponding to the first zone ZONE_1 to the second area AREA_2 to be sequentially stored according to the order of logical addresses corresponding to the first zone ZONE_1.

In addition, the memory controller 120 may divide the data corresponding to the first zone ZONE_1 into a plurality of segments and flush the plurality of segments into the plurality of memory blocks BLK included in the second area AREA_2 in parallel. Through this, the memory controller 120 may flush data corresponding to the first zone ZONE_1 to the second area AREA_2 more quickly. However, the memory controller 120 may flush data corresponding to the first zone ZONE_1 to one of the plurality of memory blocks BLK included in the second area AREA_2.

After the data corresponding to the first zone ZONE_1 is flushed to the second area AREA_2, the memory controller 120 may erase the data corresponding to the first zone ZONE_1 or set the data corresponding to the first zone ZONE_1 as invalid data in the first area AREA_1 so that the data corresponding to the first zone ZONE_1 is no longer accessed.

As described above, data corresponding to the plurality of zones ZONE is first written to the first area AREA_1 and then flushed into the second area AREA_2. Accordingly, the size of the first area AREA_1 may be set to a size in which data corresponding to zones in which flush condition is not yet satisfied can be written.

Figure 7:
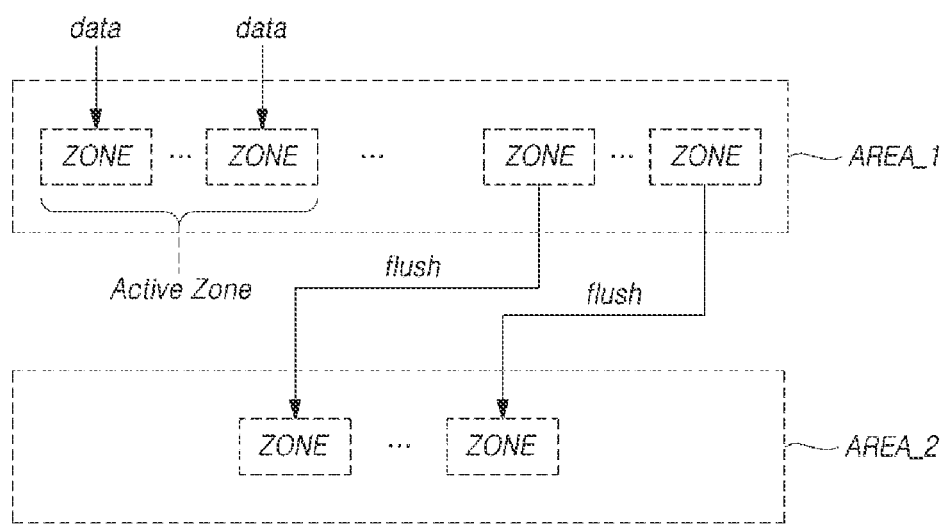
FIG. 7 illustrates the size of the first area according to embodiments of the present disclosure.

FIG. 7 illustrates the size of the first area AREA_1 according to embodiments of the present disclosure.

Referring to FIG. 7, the size of the first area AREA_1 may be determined based on i) the minimum value of the number of active zones and ii) the number of zones having corresponding data that can be flushed simultaneously from the first area AREA_1 to the second area AREA_2.

Active zone means a zone to which data can be written. For example, the active zone may be randomly selected from among the plurality of zones ZONE.

In the embodiments of the present disclosure, a number of zones greater than or equal to a preset minimum value may be activated among the plurality of zones ZONE. Accordingly, data may be written to at least as many zones as the minimum value of the number of active zones, and the active zones may be mapped to the first area AREA_1. Accordingly, the first area AREA_1 should be able to store data having a size corresponding to at least the minimum value of the number of active zones.

Data corresponding to zones satisfying the set flush condition among the plurality of zones ZONE may be flushed from the first area AREA_1 to the second area AREA_2. In this case, zones that satisfy the set flush condition may not be active zones.

In this case, data corresponding to M zones where M is a natural number, may be flushed simultaneously from the first area AREA_1 to the second area AREA_2. For example, data corresponding to only one zone may be flushed from the first area AREA_1 to the second area AREA_2 at a specific time. For another example, data corresponding to 4 zones may be simultaneously flushed from the first area AREA_1 to the second area AREA_2.

In this case, data flushed simultaneously from the first area AREA_1 to the second area AREA_2 should be maintained in the first area AREA_1 until the flush operation is completed.

Accordingly, i) data flushed simultaneously from the first area AREA_1 to the second area AREA_2 and ii) data corresponding to as many zones as the minimum value of the number of active zones should be able to be stored together in the first area AREA_1.

The minimum value of the size of the active zone may be determined based on the minimum value of the number of active zones. The size of zones in which corresponding data can be simultaneously flushed from the first area AREA_1 to the second area AREA_2 may be determined by the number of zones, having data that can be simultaneously flushed from the first area AREA_1 to the second area AREA_2.

Accordingly, the size of the first area AREA_1 may be determined based on i) the minimum value of the number of active zones among the plurality of zones ZONE and ii) the number of zones having data that can be flushed simultaneously from the first area AREA_1 to the second area AREA_2.

Furthermore, the size of the first area AREA_1 may be determined based on the number of memory blocks BLK included in the first area AREA_1. As a result, the number of memory blocks BLK included in the first area AREA_1 may also be determined based on i) the minimum value of the number of active zones among the plurality of zones ZONE, and ii) the number of zones having data that can be flushed simultaneously from the first area AREA_1 to the second area AREA_2.

In the embodiments of the present disclosure, data corresponding to the plurality of zones ZONE may be first written to the first area AREA_1. Accordingly, the plurality of zones ZONE may be mapped to the first area AREA_1.

Hereinafter, an embodiment in which the plurality of zones ZONE are mapped to the first area AREA_1 will be described.

Figure 8:
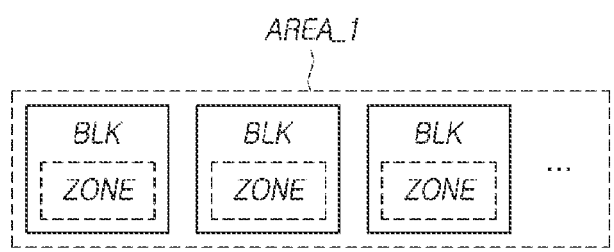
FIG. 8 illustrates an example of how the memory system maps the plurality of zones to the first area according to embodiments of the present disclosure.

FIG. 8 illustrates an example of how the memory system 100 maps the plurality of zones ZONE to the first area AREA_1 according to embodiments of the present disclosure.

Referring to FIG. 8, the memory controller 120 of the memory system 100 may map each of the plurality of zones ZONE to one of the memory blocks BLK included in the first area AREA_1.

That is, each of the plurality of zones ZONE may be mapped to a different memory block BLK. Accordingly, only one zone may be mapped to one memory block BLK included in the first area AREA_1 and it is impossible for two or more zones to be mapped to the same memory block BLK.

In this case, the type of the memory block BLK mapped to each of the plurality of zones ZONE may vary according to the size of the mapped zone. For example, if storage capacity of an SLC memory block is equal to or greater than the size of a zone, the SLC memory block may be set to be mapped to the zone.

In this case, only one zone is mapped to one memory block BLK. Accordingly, compared to a case in which two or more zones are mapped to one memory block, the size of data written to one memory block BLK is smaller. Also, an overhead for distinguishing different zones within same memory block BLK is unnecessary.

After data corresponding to the zone mapped to one memory block BLK in the first area AREA_1 is flushed to the second area AREA_2, the memory controller 120 may erase the memory block BLK in the first area AREA_1 so that data corresponding to a new zone is written into the memory block BLK in the first area AREA_1. In this case, since the memory controller 120 does not need to migrate data from the memory block BLK to another memory block in the first area AREA_1, the write amplification factor (WAF) does not increase.

Accordingly, the reliability of the memory device 100 may increase and the lifetime of the memory block BLK included in the first area AREA_1 may increase. As a result, the performance of the memory system 100 may be improved.

Figure 9:
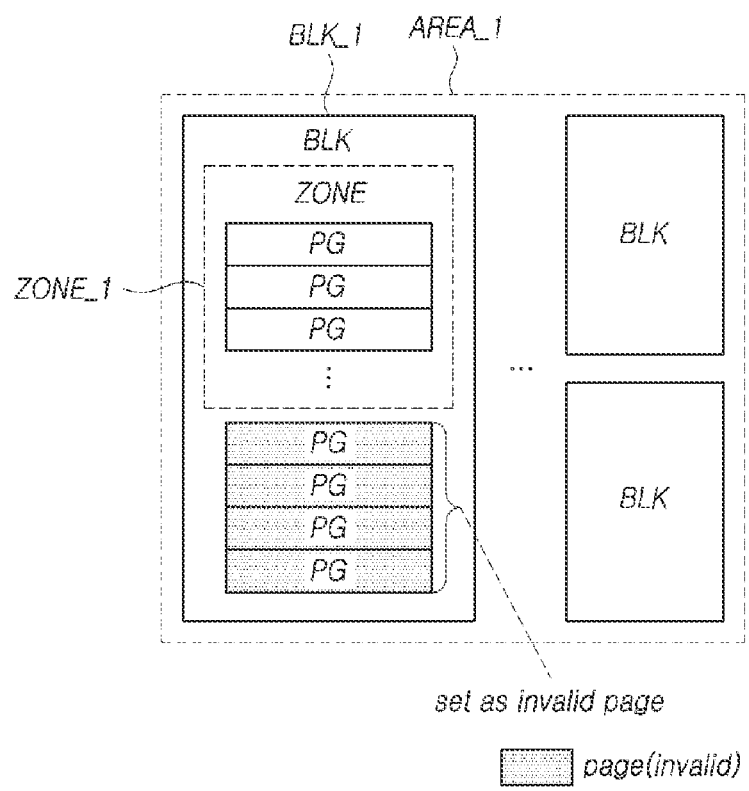
FIG. 9 illustrates an example of how the memory system maps the first zone to the first memory block according to embodiments of the present disclosure.

FIG. 9 illustrates an example of how the memory system 100 maps the first zone ZONE_1 to the first memory block BLK_1 according to embodiments of the present disclosure.

Referring to FIG. 9, the memory controller 120 of the memory system 100 may map the first memory block BLK_1 among the memory blocks BLK included in the first area AREA_1 to the first zone ZONE_1.

In this case, the size of the first zone ZONE_1 is less than or equal to the storage capacity of the first memory block BLK_1. Accordingly, a page that is not mapped to the first zone ZONE_1 may exist among the pages PG included in the first memory block BLK_1.

In this case, the memory controller 120 may set a page that is not mapped to the first zone ZONE_1 among the pages PG included in the first memory block BLK_1 as an invalid page to which no valid data is written.

In this case, the invalid page may be maintained in an erase state. Alternatively, dummy data may be written to the invalid page.

Figure 10:
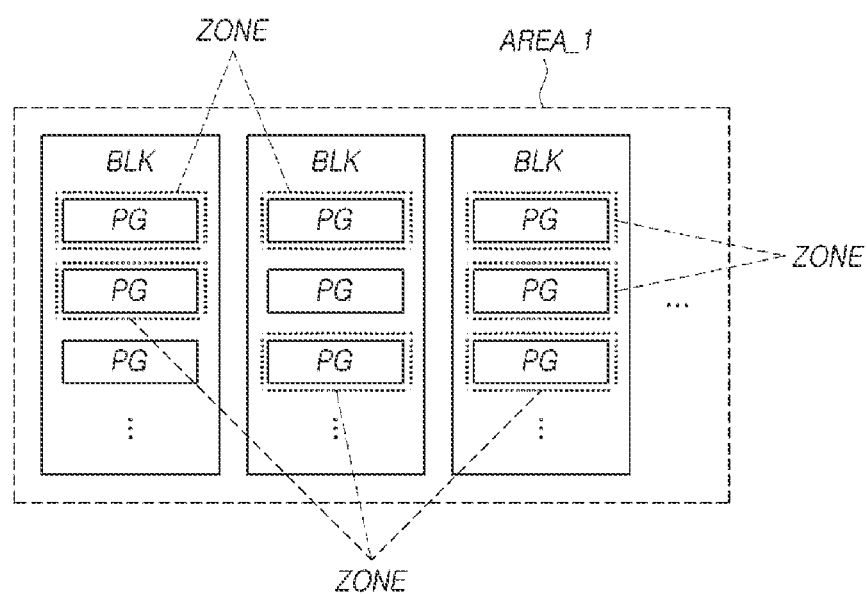
FIG. 10 illustrates another example of how the memory system maps the plurality of zones to the first area according to embodiments of the present disclosure.

FIG. 10 illustrates another example of how the memory system 100 maps the plurality of zones ZONE to the first area AREA_1 according to embodiments of the present disclosure.

Referring to FIG. 10, the memory controller 120 of the memory system 100 may divide each of the plurality of zones ZONE into a plurality of sub-zones SUB_ZONE. In this case, the size of each of the sub-zones SUB_ZONE may be the size of one of the plurality of pages PG included in the first area AREA_1.

That is, one zone is divided into a plurality of sub-zones SUB_ZONE and each of the plurality of sub-zones SUB_ZONE included in one zone may be mapped to a plurality of pages PG included in the first area AREA_1. The plurality of sub-zones SUB_ZONE included in one zone may be mapped to pages in the same memory block or to pages in different memory blocks.

As such, when each of the plurality of zones ZONE is divided into a plurality of sub-zones SUB_ZONE, the memory controller 120 may reduce the waste of space in the first area AREA_1. This is because the memory controller 120 may map a sub-area having a size smaller than the size of one zone in the first area AREA_1 to specific sub-zones.

However, the memory controller 120 may need to manage information indicating which page of the pages PG included in the first area AREA_1 corresponds to each of the plurality of sub-zones SUB_ZONE included in one zone.

Figure 11:
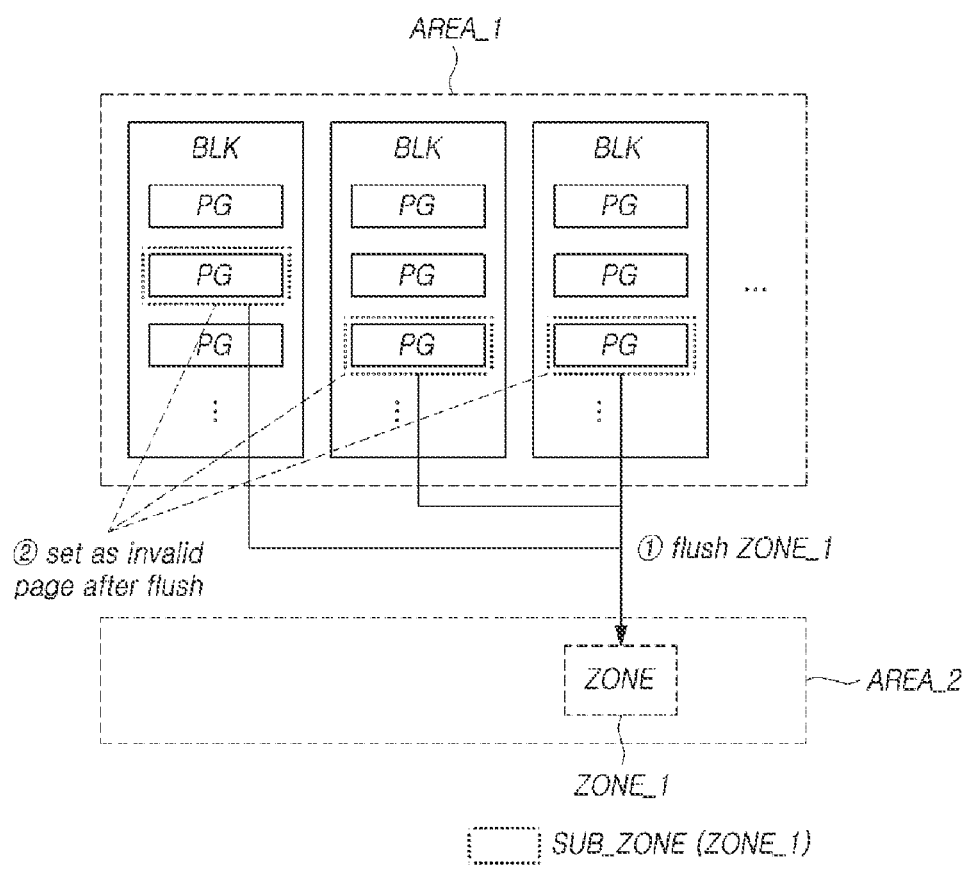
FIG. 11 illustrates an example of how the memory system flushes data corresponding to the first zone to the second area according to embodiments of the present disclosure.

FIG. 11 illustrates an example of how the memory system 100 flushes data corresponding to the first zone ZONE_1 to the second area AREA_2 according to embodiments of the present disclosure.

Referring to FIG. 11, in order to flush data corresponding to the first zone ZONE_1 to the second area AREA_2, the memory controller 120 of the memory system 100 may flush data stored in the page PG corresponding to each of the plurality of sub-zones SUB_ZONE included in the first zone ZONE_1 to the second area AREA_2 (①).

Thereafter, the memory controller 120 may set pages PG corresponding to the sub-zones SUB_ZONE included in the first zone ZONE_1 in the first area AREA_1 as invalid pages in which valid data is not written (②). This is because, since data corresponding to the first zone ZONE_1 is already stored in the second area AREA_2, it is no longer necessary to maintain the data corresponding to the first zone ZONE_1 in the first area AREA_1.

As described above, if the process of setting pages corresponding to sub-zones included in a specific zone in the first area AREA_1 as invalid page is repeated, the number of invalid pages in the first area AREA_1 increases and the free space in which data can be written in the first area AREA_1 decreases.

Accordingly, the memory controller 120 may perform garbage collection in order to secure a free space for storing data in the first area AREA_1.

Figure 12:
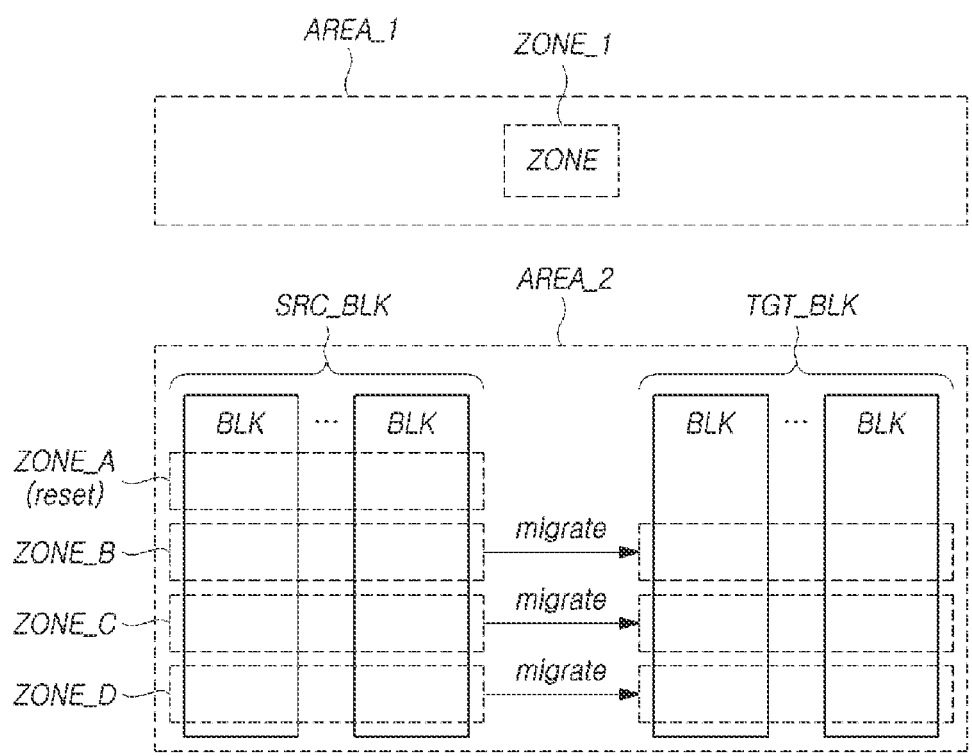
FIG. 12 and FIG. 13 illustrate another example of how the memory system flushes data corresponding to the first zone to the second area according to embodiments of the present disclosure.
Figure 13:
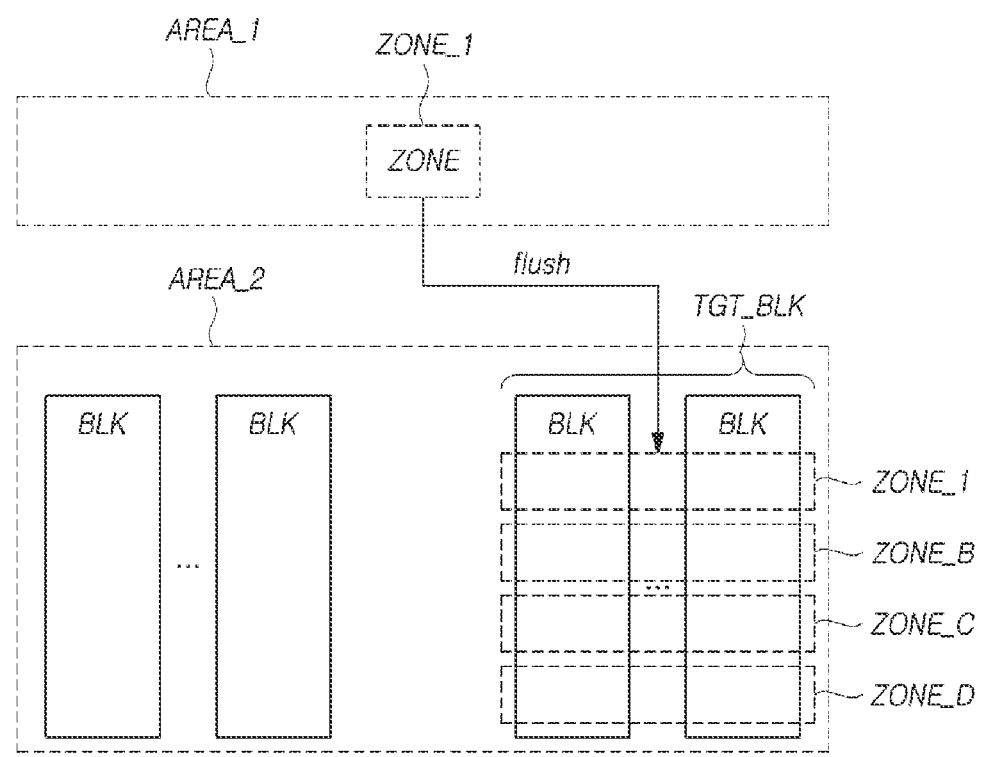

FIG. 12 and FIG. 13 illustrate another example of how the memory system 100 flushes data corresponding to the first zone ZONE_1 to the second area AREA_2 according to embodiments of the present disclosure.

Referring to FIG. 12, N zones where N is a natural number, have already been flushed in the second area AREA_2.

In FIG. 12, N zones flushed to the second area AREA_2 may be distributed and mapped to one or more source memory blocks SRC_BLK. When a zone is distributed and mapped to one or more source memory blocks SRC_BLK, a read or write operation for the zone may be executed in parallel. Accordingly, the read performance or write performance of the memory system 100 for the zone may be improved.

However, unlike shown in FIG. 12, each of the N zones flushed in the second area AREA_2 may be mapped to only one memory block BLK.

Hereinafter, in FIG. 12, N is 4 and the N zones flushed to the second area AREA_2 are ZONE_A, ZONE_B, ZONE_C and ZONE_D respectively.

In FIG. 12, zones ZONE_A, ZONE_B, ZONE_C and ZONE_D are mapped to one or more source memory blocks SRC_BLK among memory blocks BLK included in the second area AREA_2.

The memory controller 120 of the memory system 100 may migrate data corresponding to valid zones among the N zones flushed to the second area AREA_2 from the source memory block SRC_BLK to one or more target memory block TGT_BLK included in the second area AREA_2.

In FIG. 12, zone ZONE_A is no longer valid (e.g. when zone ZONE_A is reset), and the zones ZONE_B, ZONE_C and ZONE_D are valid. In this case, the memory controller 120 may migrate data corresponding to the valid zones ZONE_B, ZONE_C and ZONE_D to the target memory block TGT_BLK.

Referring to FIG. 13, there is a free space for storing data corresponding to zones other than the zones ZONE_B, ZONE_C and ZONE_D in the target memory block TGT_BLK.

Accordingly, the memory controller 120 of the memory system 100 may flush data corresponding to the first zone ZONE_1 to the target memory block TGT_BLK. In this case, data corresponding to the zones ZONE_B, ZONE_C and ZONE_D and data corresponding to the first zone ZONE_1 may be stored in the target memory block TGT_BLK.

Figure 14:
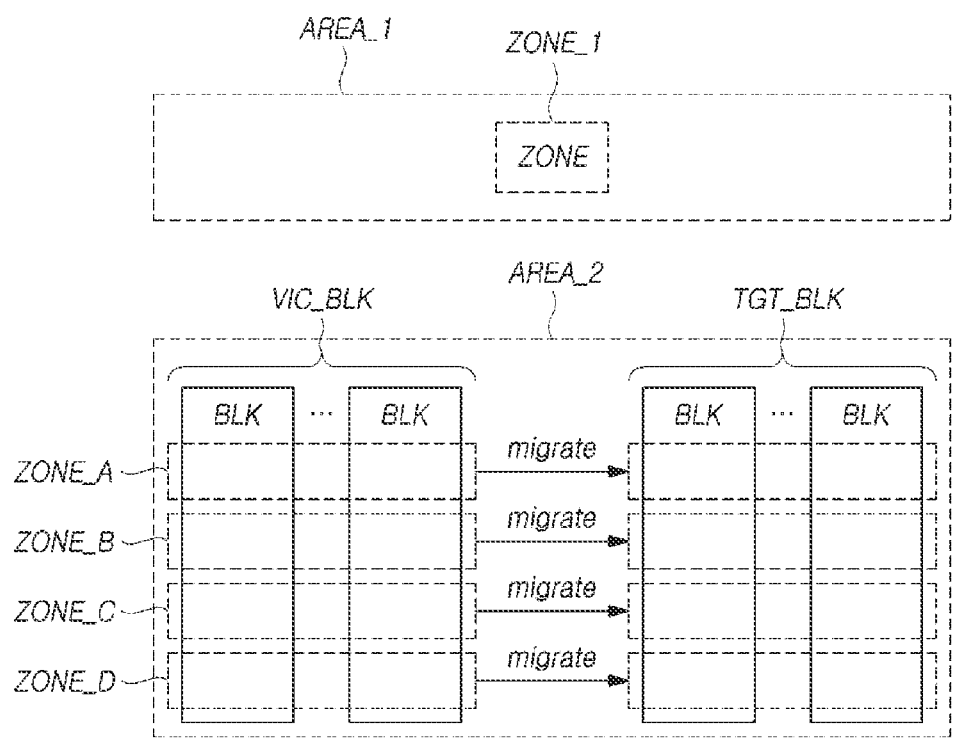
FIG. 14 and FIG. 15 illustrate another example of how the memory system flushes data corresponding to the first zone to the second area according to embodiments of the present disclosure.
Figure 15:
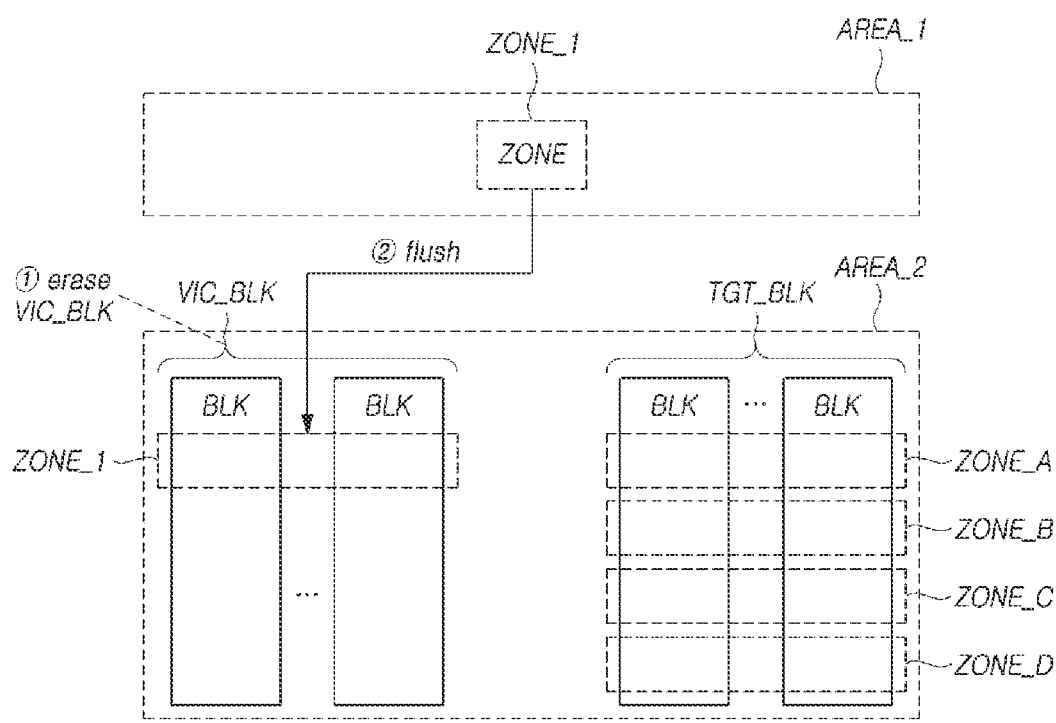

FIG. 14 and FIG. 15 illustrates another example of how the memory system 100 flushes data corresponding to the first zone ZONE_1 to the second area AREA_2 according to embodiments of the present disclosure.

Referring to FIG. 14 the memory controller 120 of the memory system 100 may migrate valid data, among data corresponding to the N zones, where N is a natural number, in one or more victim memory blocks VIC_BLK included in the second area AREA_2, to one or more target memory blocks TGT_BLK included in the second area AREA_2.

In this case, the memory controller 120 may determine M, where M is a natural number, memory blocks, among the memory blocks BLK included in the second area AREA_2, having the largest size of invalid data stored as the victim memory blocks VIC_BLK.

In FIG. 14, zone ZONE_A, ZONE_B, ZONE_C and ZONE_D are flushed to the victim memory block VIC_BLK. In this case, the memory controller 120 may migrate only valid data among data corresponding to the zones ZONE_A, ZONE_B, ZONE_C and ZONE_D to the target memory block TGT_BLK. After the migration is completed in this way, valid data no longer exists in the victim memory blocks VIC_BLK.

Referring to FIG. 15, the memory controller 120 of the memory system 100 may first erase the victim memory block VIC_BLK in order to flush the data corresponding to the first zone ZONE_1 to the victim memory block VIC_BLK (①).

Thereafter, the memory controller 120 may flush data corresponding to the first zone ZONE_1 to the erased victim memory block VIC_BLK (②).

Figure 16:
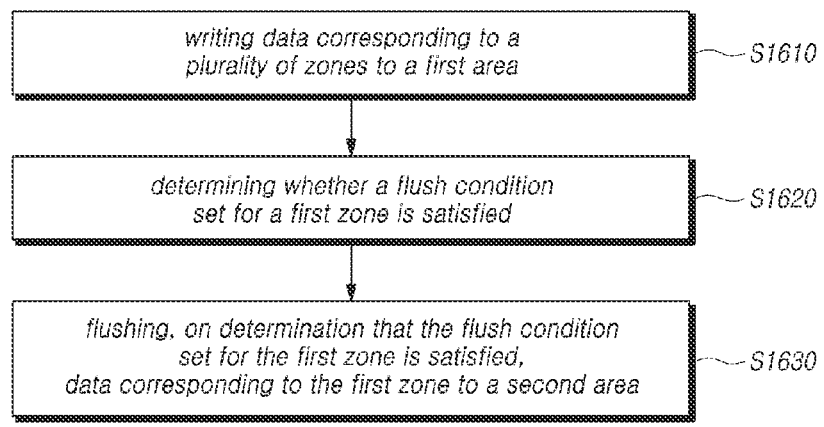
FIG. 16 illustrates an operating method of the memory system according to embodiments of the present disclosure.

FIG. 16 illustrates an operating method of the memory system 100 according to embodiments of the present disclosure.

Referring to FIG. 16, the operating method of the memory system 100 may include writing data corresponding to a plurality of zones ZONE to a first area AREA_1 (S1610). The first area AREA_1 may include two or more of a plurality of memory blocks BLK. Each of the plurality of memory blocks BLK may include a plurality of pages PG.

The number of memory blocks included in the first area AREA_1 may be determined based on i) the minimum value of the number of active zones to which data can be written, and ii) the number of zones having data that can be flushed simultaneously from the first area AREA_1 to the second area AREA_2.

In this case, the size of each of the plurality of zones ZONE is less than or equal to a storage capacity of each of the plurality of memory blocks BLK.

Moreover, the operation S1610 may map each of the plurality of zones ZONE to one of the memory blocks BLK included in the first area AREA_1.

The operation S1610 may include mapping one or more pages within a first memory block BLK_1 among the memory blocks BLK included in the first area AREA_1 to the first zone ZONE_1; and setting remaining pages, to which the first zone ZONE_1 is not mapped, within the first memory block BLK_1 as invalid such that data is not to be written into the remaining pages.

For another example, the operation S1610 may include dividing each of the plurality of zones ZONE into a plurality of sub-zones SUB-ZONE each having a size of one of a plurality of pages PG included in the first area AREA_1; and mapping each of the plurality of sub-zones SUB_ZONE included in each of the plurality of zones ZONE to one of the plurality of pages PG included in the first area AREA_1.

At this time, the operating method of the memory system 100 may further include setting, after data corresponding to the first zone ZONE_1 is flushed to the second area AREA_2, pages PG corresponding to sub-zones SUB-_ZONE included in the first zone ZONE_1 in the first area AREA_1 as invalid pages to which valid data is not written.

And the operating method of the memory system 100 may include determining whether a flush condition set for a first zone ZONE_1 among the plurality of zones ZONE is satisfied (S1620).

For example, the operation S1620 may determine that the flush condition set for the first zone ZONE_1 is satisfied when i) the first zone ZONE_1 is full of data, ii) a finish command for the first zone ZONE_1 is received from outside the memory system, or iii) the state of the first zone ZONE_1 is changed to read-only state.

The operating method of the memory system 100 may include flushing, on a determination that the flush condition set for the first zone ZONE_1 is satisfied, data corresponding to the first zone ZONE_1 to a second area AREA_2 (S1630). The second area AREA_2 may include two or more of the plurality of memory blocks BLK.

For example, the operation S1630 may include migrating data corresponding to a valid zone, among N zones, where N is a natural number, flushed to the second area AREA_2 to one or more target memory blocks TGT_BLK included in the second area AREA_2; and flushing data corresponding to the first zone ZONE_1 to the target memory block TGT_BLK.

For another example, the operation S1630 may include migrating valid data, among data corresponding to the N zones in one or more victim memory blocks VIC_BLK included in the second area AREA_2, to one or more target memory blocks TGT_BLK included in the second area AREA_2; erasing the victim memory blocks VIC_BLK; and flushing, after erasing the victim memory blocks VIC_BLK, data corresponding to the first zone ZONE_1 to the victim memory block VIC_BLK.

Figure 17:
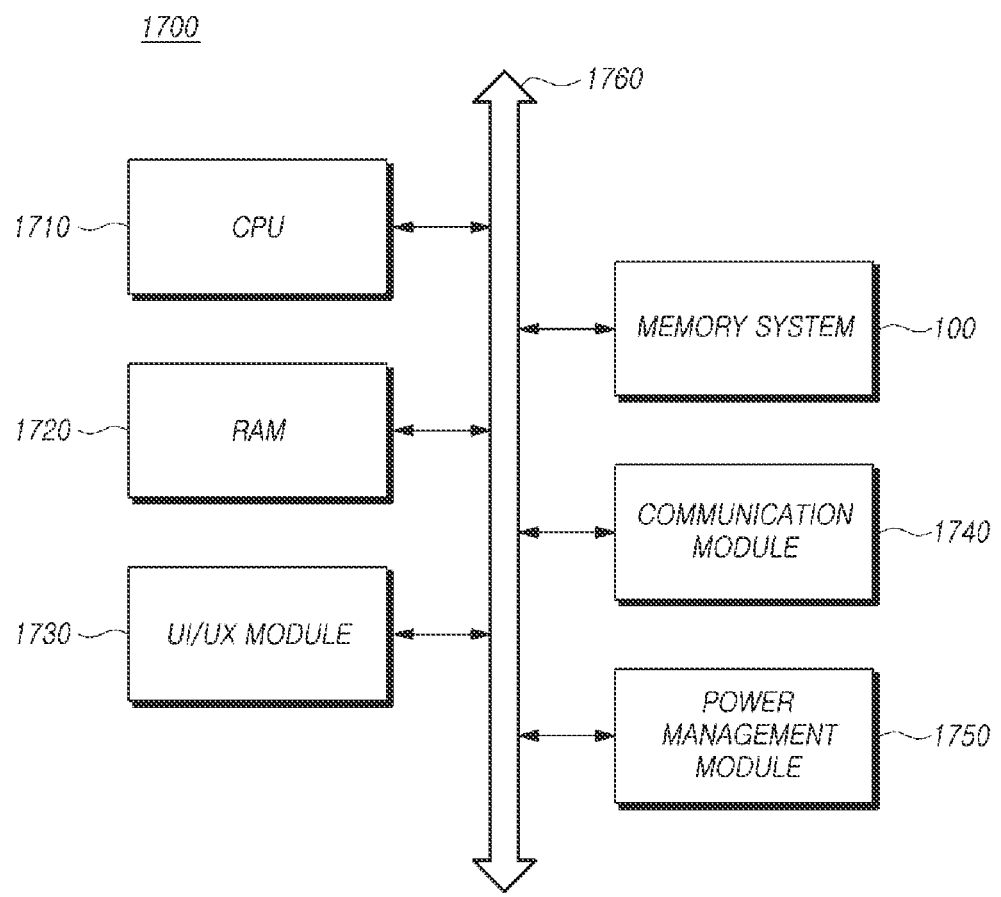
FIG. 17 is a diagram illustrating the configuration of a computing system based on some embodiments of the disclosed technology.

FIG. 17 is a diagram illustrating the configuration of a computing system 1700 based on an embodiment of the disclosed technology.

Referring to FIG. 17, the computing system 1700 based on an embodiment of the disclosed technology may include: a memory system 100 electrically connected to a system bus 1760; a CPU 1710 configured to control the overall operation of the computing system 1700; a RAM 1720 configured to store data and information related to operations of the computing system 1700; a user interface/user experience (UI/UX) module 1730 configured to provide the user with a user environment; a communication module 1740 configured to communicate with an external device as a wired and/or wireless type; and a power management module 1750 configured to manage power used by the computing system 1700.

The computing system 1700 may be a personal computer (PC) or may include a mobile terminal such as a smartphone, a tablet or various electronic devices.

The computing system 1700 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A memory system comprising:
a memory device including a plurality of memory blocks each including a plurality of pages; and
a memory controller configured to:
write data corresponding to a plurality of zones to a first area including two or more of the plurality of memory blocks, and
flush the data corresponding to a first zone among the plurality of zones to a second area including two or more of the plurality of memory blocks on determination that a flush condition set for the first zone is satisfied,
wherein a size of each of the plurality of zones is less than or equal to a storage capacity of each of the plurality of memory blocks.

2. The memory system of claim 1, wherein a number of memory blocks included in the first area is determined based on a minimum value of a number of active zones to which data can be written and a number of zones having data that can be flushed simultaneously from the first area to the second area.

3. The memory system of claim 1, wherein the memory controller is further configured to determine that the flush condition set for the first zone is satisfied when the first zone is full of data, a finish command for the first zone is received from outside the memory system, or a state of the first zone is changed to a read-only state.

4. The memory system of claim 1, wherein the memory controller maps each of the plurality of zones to one of the memory blocks included in the first area.

5. The memory system of claim 1, wherein the memory controller maps one or more pages within a first memory block among the memory blocks included in the first area to the first zone, and
sets remaining pages, to which the first zone is not mapped, within the first memory block as invalid such that data is not to be written into the remaining pages.

6. The memory system of claim 1, wherein the memory controller divides each of the plurality of zones into a plurality of sub-zones each having a size of one of a plurality of pages included in the first area, and
maps each of the plurality of sub-zones included in each of the plurality of zones to one of the plurality of pages included in the first area.

7. The memory system of claim 6, wherein the memory controller is further configured to set the pages, which are mapped to the sub-zones included in the first zone, as invalid after the flushing such that valid data is not to be written into the invalid pages.

8. The memory system of claim 1,
wherein the memory controller flushes the data corresponding to the first zone to one or more target memory blocks included in the second area, and
wherein the memory controller is further configured to migrate valid data which is previously flushed into a source memory block in the second area, to the target memory blocks.

9. The memory system of claim 1,
wherein the memory controller is further configured to:
migrate valid data, among data, which is previously flushed into one or more victim memory blocks included in the second area, to one or more target memory blocks included in the second area, and
erase the victim blocks, and
wherein the memory controller flushes, after the erasing, the data corresponding to the first zone to the victim memory blocks.

10. The memory system of claim 9, wherein the memory controller is further configured to determine, as the victim memory blocks, M memory blocks with the largest size of stored invalid data among the memory blocks included in the second area.

11. A memory controller comprising:
a memory interface for communicating with an external device including a plurality of memory blocks each including a plurality of pages; and
a control circuit configured to:
write data corresponding to a plurality of zones to a first area including two or more of the plurality of memory blocks, and
flush the data corresponding to a first zone among the plurality of zones to a second area including two or more of the plurality of memory blocks on determination that a flush condition set for the first zone is satisfied,
wherein a size of each of the plurality of zones is less than or equal to a storage capacity of each of the plurality of memory blocks.

12. An operating method of a memory system, the operating method comprising:
writing data corresponding to a plurality of zones to a first area including two or more of a plurality of memory blocks each including a plurality of pages;
determining whether a flush condition set for a first zone among the plurality of zones is satisfied; and
flushing, on determination that the flush condition set for the first zone is satisfied, the data corresponding to the first zone to a second area including two or more of the plurality of memory blocks,
wherein a size of each of the plurality of zones is less than or equal to a storage capacity of each of the plurality of memory blocks.

13. The operating method of claim 12, wherein a number of memory blocks included in the first area is determined based on a minimum value of a number of active zones to which data can be written and a number of zones having data that can be flushed simultaneously from the first area to the second area.

14. The operating method of claim 12, wherein the flush condition set for the first zone is determined to be satisfied when the first zone is full of data, a finish command for the first zone is received from outside the memory system, or a state of the first zone is changed to read-only state.

15. The operating method of claim 12, wherein the writing includes mapping each of the plurality of zones to one of the memory blocks included in the first area.

16. The operating method of claim 12,
wherein the writing comprises:
mapping one or more pages within a first memory block among the memory blocks included in the first area to the first zone, and
setting remaining pages, to which the first zone is not mapped, within the first memory block as invalid such that data is not to be written into the remaining pages.

17. The operating method of claim 12, wherein the writing further comprises:
dividing each of the plurality of zones into a plurality of sub-zones each having a size of one of a plurality of pages included in the first area; and
mapping each of the plurality of sub-zones included in each of the plurality of zones to one of the plurality of pages included in the first area.

18. The operating method of claim 12, further comprising setting the pages, which are mapped to the sub-zones included in the first zone, as invalid after the flushing such that valid data is not to be written into the invalid pages.

19. The operating method of claim 12,
wherein data corresponding to the first zone is flushed to one or more target memory blocks included in the second area, further comprises:
migrating valid data, which is previously flushed into a source memory block in the second area, to the target memory blocks.

20. The operating method of claim 12,
further comprising:
migrating valid data, which is previously flushed into one or more victim memory blocks included in the second area, to one or more target memory blocks included in the second area; and
erasing the victim blocks,
wherein the data corresponding to the first zone is flushed to the victim memory blocks after the erasing.

* * * * *